United States Patent [19]

Hoshiko

[11] Patent Number: 4,965,290

[45] Date of Patent: Oct. 23, 1990

[54] LOW PERMITTIVITY COMPOSITE MATERIAL

[75] Inventor: Takeshi Hoshiko, Koganei, Japan

[73] Assignee: Junkosha Co., Ltd., Tokyo, Japan

[21] Appl. No.: 314,051

[22] Filed: Feb. 22, 1989

[30] Foreign Application Priority Data

Mar. 4, 1988 [JP] Japan .................................. 63-52243

[51] Int. Cl.$^5$ .............................................. C08J 9/32
[52] U.S. Cl. ...................................... 521/54; 521/134; 521/139; 521/140
[58] Field of Search ................... 521/54, 134, 139, 140

[56] References Cited

U.S. PATENT DOCUMENTS

| | | |
|---|---|---|
| 3,615,972 | 10/1971 | Morehouse, Jr. et al. ............ 521/56 |
| 3,864,181 | 2/1975 | Wolinski et al. ....................... 521/54 |
| 4,379,858 | 4/1983 | Suzuki .................................... 521/54 |
| 4,451,585 | 5/1984 | Anderson .............................. 521/54 |
| 4,485,192 | 11/1984 | Gibbs et al. ........................... 521/54 |
| 4,595,623 | 6/1986 | Du Pont et al. ....................... 521/54 |
| 4,699,810 | 10/1987 | Blakeman et al. .................... 521/54 |
| 4,719,249 | 1/1988 | Dietlein ................................. 521/54 |
| 4,891,387 | 1/1990 | Jauda et al. ........................... 521/54 |

*Primary Examiner*—Morton Foelak

*Attorney, Agent, or Firm*—Horst M. Kasper

[57] ABSTRACT

A method for production of a composite material comprises the incorporation of a foaming agent into a thermo-fusible fluoro-resin for providing bubbles in the thermo-fusible fluoro-resin. The thermo-fusible fluoro-resin is comminuted to a suitable size, and the comminuted thermo-fusible fluoro-resin is mixed with a polymer for surrounding and supporting the thermo-fusible fluoro-resin with the polymer. The thermo-fusible fluoro-resin is foamed after incorporation of the foaming agent. The comminuted thermo-fusible fluoro-resin is foamed after mixing with the polymer. A composite material having low permittivity comprises hollow bubbles formed of a thermo-fusible fluoro-resin and a polymer material surrounding and supporting the thermo-fusible fluoro-resin forming the hollow bubbles. A first hollow bubble and a second hollow bubble are separated from each other by a layer of the thermo-fusible fluoro-resin of the first bubble, followed by a layer of polymer material, followed by a layer of thermo-fusible fluoro-resin of the second bubble. The ratio of the thickness of the polymer layer to the sum of the layers of the thermo-fusible fluoro-resin is on average from about 0.3 to 3.

13 Claims, No Drawings

LOW PERMITTIVITY COMPOSITE MATERIAL

BACKGROUND OF THE INVENTION

1. Field of the Invention

The present invention relates to a low permittivity composite material having improved electric characteristics and other properties based on dispersing hollow fluoro-resin particles in a base material comprising polymer material.

2. Brief Description of the Background of the Invention Including Prior Art

Various types of plastic and rubber have been in use as insulating material for a long time. It has recently been proposed, in Japanese Patent Applications Laid Open No. 62-48710 and No. 62-48711, to mix microscopic, hollow balls of glass or silica, having included nitrogen gas, carbonic acid gas, or some other gas, as a filler, with an insulating material with the aim to improve the electrical characteristics and properties of the insulating material by the use of these low permittivity fillers.

Since these microscopic hollow balls are hard based on their chemical composition, their nature, and the properties of these materials, the softness of the resulting insulating material is substantially reduced as compared with the base material after the mixing of the soft insulating material with the hollow balls. The resultant fragility of the composite material presents a serious problem.

It is also conceivable to use microscopic hollow balls of plastic instead of glass ones. Nevertheless, the use of microscopic hollow balls made of a plastic material gives rise to another problem. The conventional method of manufacturing microscopic hollow balls depends heavily on properties related to a molding process, such as the fusing viscosity, melting point, flow and space filling properties, etc. of the resin which serves as the base material. Therefore, a material such as a fluoro-resin which, despite its excellent properties as a hollow ball material, exhibits inadequate processing properties for molding, and will present difficulties if it has to be used as a resin material for hollow particles.

Accordingly, those materials available for molding hollow particles are made of a very limited number of materials including vinylidene chloride-acrylonitrile copolymer. Nevertheless, there remains a problem in heat resistance due to a low melting point for microscopic hollow balls made of vinylidene chloride-acrylonitrile copolymer. Another drawback of vinylidene chloride-acrylonitrile copolymer is that it is easily affected by organic solvents. Therefore, vinylidene chloride-acrylonitrile copolymer imposes many restrictions on a manufacturing process and requires specific conditions for its subsequent use when mixed with an insulating material such as plastic. Thus, substantial problems remain associated with a conventional composite material and its manufacture involving use of microscopic hollow balls made of glass or plastic.

SUMMARY OF THE INVENTION

1. Purposes of the Invention

It is an object of the present invention to overcome processing and manufacturing problems associated with conventional compound material using and incorporating microscopic hollow balls.

It is another object of the present invention to provide a composite material exhibiting a low electrical permittivity and capable of satisfactorily maintaining softness in connection with a soft polymer material employed as the base material during extended use conditions.

It is yet another object of the present invention to provide a novel material exhibiting advantageous properties as an electrical insulator.

These and other objects and advantages of the present invention will become evident from the description which follows.

2. Brief Description of the Invention

According to one aspect of the present invention, a low permittivity composite material is produced by mixing a ground thermo-fusible fluoro-resin foamed body with a polymer material.

Further, according to another aspect of the present invention, low permittivity composite material is fabricated by foaming a ground thermo-fusible fluoro-resin embedded in a polymer material and containing a latent foaming agent such that the embedded fluoro-resin foams while inside the polymer material.

The fabrication method for the present invention composites has been found to be substantially parallel to methods employed in the fabrication of plastic materials with incorporated hollow particles.

As compared with conventional fluoro-resin foam materials produced for electrical applications, the permittivity is lowered substantially in the thermo-fusible fluoro-resin foam according to the invention due to a large number of bubbles existing within the fluoro-resin foam material.

When a foamed body is ground appropriately, the particles obtained are hollow and contain bubbles inside them. When these hollow particles are mixed with a polymer material such as rubber or plastic, then the overall permittivity is lowered and a low permittivity composite material is obtained. Since these hollow particles are made of fluoro-resin, which is highly resistant to heat and chemicals, they remain unaffected by heat, by organic solvents and similar environments during a manufacturing process and during subsequent use. Thus they present an advantageous composite material which is extremely easy to use. In addition, these hollow particles are not hard based on the natural properties of the material of which they are made. Therefore, the softness of the composite material deteriorates hardly at all or not at all after molding.

According to a second aspect of the present invention, a thermo-fusible fluoro-resin containing a foaming agent still to foam within the thermo-fusible thermoresin is ground. The thermo-fusible fluoro-resin particles are mixed with polymer material and they are caused to foam. This generates a presence of a large number of low permittivity hollow fluoro-resin particles inside the polymer material. As a result, the overall permittivity lowers and is decreased and low permittivity composite material is produced.

In general, chemical foaming agents tend to be decomposed by water, organic solvents and the like, and are unable to be used in a manufacturing process where such decomposition-inducing agents are present. However, according to the present invention, the foaming agent is covered by and included in a highly chemical-resistant thermo-fusible fluoro ™ resin and, consequently, if for example ethylene tetrafluoride resin, requiring the presence of an organic solvent in a molding process, represents the polymer material employed as the base material, then the contact with these organic solvent liquids is prevented effectively and a decomposition of the foaming agent can be avoided before a processing for molding occurs and foaming can reliably be performed.

According to a third aspect of the present invention, a thermo-fusible fluoro-resin containing a foaming agent, still to foam therein, is ground. After grinding, the thermo-fusible fluoro-resin particles are foamed to substantially form hollow spheres. The resulting particles are mixed with a polymer material such as rubber or plastic in a method similar to that described in connection with the first aspect of the invention.

The novel features which are considered as characteristic for the invention are set forth in the appended claims. The invention itself, however, both as to its structure and its method of operation, together with additional objects and advantages thereof, will be best understood from the following description of specific embodiments when read in connection with the accompanying examples.

DESCRIPTION OF INVENTION AND PREFERRED EMBODIMENT

Low permittivity composite material according to the present invention contains hollow particles made of a fluoro-resin, where a fluoro-resin is a hydrocarbon material where a substantial part of the hydrogen atoms, and in particular more than 80 percent of the hydrogen atoms, and preferably more than 95 percent of the hydrogen atoms, are substituted by fluorine atoms. Such resin can contain other electronegative atoms such as, for example, chlorine and/or oxygen in an amount of less than 10 and preferably less than 1 atomic percent of the total of hydrogen and fluorine atom present in the resin. Furthermore, where such electronegative atoms represent at least two-valent elements, they can perform linking functions between two carbon atoms coordinated to such electronegative atom.

A composite material having low permittivity comprises hollow bubbles formed of a thermo-fusible fluoro-resin and a polymer material surrounding and supporting the thermo-fusible fluoro-resin forming the hollow bubbles. The hollow bubbles can be substantially separated from neighboring bubbles by the polymer material. A first hollow bubble and a second hollow bubble can be separated from each other by a layer of the thermo-fusible fluoro-resin of the first bubble, followed by a layer of polymer material, followed by a layer of thermo-fusible fluoro-resin of the second bubble. The ratio of the thickness of the polymer layer to the sum of the layers of the thermo-fusible fluoro-resin can be from about 0.3 to 3. The hollow bubbles can be defined by a foamed thermo-fusible fluoro-resin subjected to grinding and mixed with the polymer material. The hollow bubbles can have a diameter which is less than about half of the average grain size of the ground thermo-fusible fluoro-resin. The hollow bubbles can be defined by a ground thermo-fusible fluoro-resin subjected to foaming and mixed with the polymer material. The hollow bubbles can be defined by a ground thermo-fusible fluoro-resin incorporated in the polymer material. The hollow bubbles can be formed inside the polymer material based on a foaming agent enclosed inside the fluoro-resin prior to incorporation and foaming.

The size of the bubbles can be from about 0.3 to 0.6 of the average grain size of ground thermo-fusible fluoro-resin. The thermo-fusible fluoro-resin can be tetrafluoro-ethylene-perfluoro-alkyl-vinyl ether. The hollow bubbles can be formed by foaming of the thermo-fusible fluoro-resin to a hollow volume comprising 50 to 90 percent of the total volume of the thermo-fusible fluoro-resin.

The polymer material can be ethylene-tetrafluoride resin.

The thermo-fusible fluoro-resin can be a member selected from the group consisting of ethylene-tetrafluoride-propylene-hexafluoride copolymer resin, ethylene-ethylene-tetrafluoride copolymer resin, ethylene-ethylene-chloride-trifluoride copolymer resin, and mixtures thereof.

The composite material can have a permittivity of less than about 1.8, and preferably less than about 1.4.

A method for production of a composite material comprises: A foaming agent is incorporated into a thermo-fusible fluoro-resin for generating bubbles in the fluoro-resin upon heating. The thermo-fusible fluoro-resin is comminuted to a suitable size. The comminuted thermo-fusible fluoro-resin is mixed with a polymer for surrounding and supporting the thermo-fusible fluoro-resin with the polymer. The thermo-fusible fluoro-resin can be foamed after incorporation of the foaming agent. The comminuted thermo-fusible fluoro-resin can be foamed after mixing with the polymer. The comminuting can be performed to a point where the average size of the bubbles is from about 0.3 to 0.6 times the average grain size of the ground thermo-fusible fluoro-resin. The polymer can be ethylene-tetrafluoride resin.

EXAMPLES 1 to 3

A tetrafluoroethylene-perfluoro-alkylvinyl-ether copolymer resin foamed body, which had been foamed at a foaming rate of 60%, was mechanically ground and comminuted into separated hollow particles containing a bubble within. The resulting thermo-fusible fluoro-resin particles were added to ethylene-tetrafluoride resin. The ethylenetetra-fluoride resin, compounded with foamed particles at varied compounding ratios, was formed into sheets and permittivities of the sheets were measured. The results are as shown in the following Table I.

TABLE I

| | | Experimental Examples | | |
|---|---|---|---|---|
| | | 1 | 2 | 3 |
| Composition | Ethylene tetrafluoride | 60 | 40 | 20 |
| | Foam particles | 40 | 60 | 80 |
| Permitivity | | 1.76 | 1.61 | 1.31 |

As shown in the Table, the composite material according to the present invention showed lower permittivities as the compound ratio of foam particles increased. No change in heat resistance and chemical resistance was observed. Concerning the mechanical properties of the compounded materials, it was observed that the softness had improved to a higher softness and elasticity value. Similar tendencies were observed when polymer material other than ethylene-tetrafluoride resin was used as the base material.

A thermo-fusing fluoro-resin foamed body was foamed by a physical foaming method, such as blowing in a gas such as chlorofluorocarbon into a fluid state or by a chemical foaming method using a chemical foaming agent, in the above recited examples. The thermo-fusing fluoro-resin foamed particles were made by mechanically grinding the thermo-fusing fluoro-resin foamed body into separate particles with a grinder like a jet mill.

The ground particles preferably exhibit a diameter which is at least twice the bubble diameter of the foam, and preferably three times the bubble diameter of the foam, so as to keep an independent bubble as a complete topological sphere inside each particle. Besides the resin used in the examples, ethylene tetrafluoride-propylene-hexafluoride copolymer resin, ethylene-ethylene-tetrafluoride copolymer resin, ethylene-ethylene-chloride-trifluoride copolymer resin and the like can be used as a thermo-fusing fluoro-resin. Their foaming rates and bubble diameters are selected to suit the purpose of use of the composite material and the kind of polymer material serving as base material. For example, average bubble diameters of from 0.02 to 1 millimeter, and preferably from 0.05 to 0.5 millimeter, can be used.

A high decomposition temperature is required for a foaming agent to be used for chemical foaming, because of a high melting point of a thermo-fusible fluoro-resin. For instance, Ficel THT (Fison Inc.), Ficel AF-100 (Fison Inc.), Expandex 150 (Olin Inc.), and Celogen HT-550 (Uniroyal Inc.) can be cited as thermo-fusible fluoro-resins. The decomposition temperature can be more than 20 degrees and preferably more than 50 degrees higher than the melting point or softening point of the thermo-fusible resin. Further, boron-nitride, carbon fluoride or the like can be added as a foaming assistant, providing a foaming core to improve the foaming capability.

In the following, a low permittivity compound material according to the second aspect of the present invention is described.

A mixture of ethylene-tetrafluoride-propylene-hexafluoride copolymer resin served as thermo-fusible fluoro-resin. A chemical foaming agent and a foaming assistant as cited above were added to the copolymer and the resulting mixture was extrusion-molded into rods at a temperature below the decomposition temperature of the foaming agent. The rods thus obtained were ground into particles using a grinder. The thermo-fusible fluoro-resin particles, containing the foaming agent inside it, were added to and mixed with a powder of ethylene-tetrafluoride resin to serve as the base material. After preforming the base material by one of the published processes, the base material was heated. The thermo-fusible fluoro-resin particles foam to be hollow particles during the heating process. As a consequence, a large number of bubbles are formed inside the plastics of ethylene-tetrafluoride resin. In this case, since the chemical foaming agent is covered with thermo-fusible fluoro-resin, the foaming agent is decomposed by heat during the heating and causes the thermo-fusible fluoro-resin particles to foam. One of the above-cited chemical foaming agents is used. In addition to ethylene-tetrafluoride resin, other thermoplastic or thermosetting resin or rubber may be used as polymer material to serve as the base material in a way similar to these recited in the aforementioned examples.

The composite material thus obtained showed a decrease in the permittivity in proportion to a rise in the compound ratio of thermo-fusible fluoro-resin particles in the same manner or in a similar way as the above-recited examples. No decline or decrease in the heat resistance, chemical resistance and the like is observed as compared to a material containing no bubble material, while an improved softness was simultaneously observed.

The present invention provides that a low permittivity thermo-fusible fluoro-resin in the form of hollow particles is dispersed in a base material comprising a polymeric material. The permittivity can be set at a desired level by selecting low permittivity material, a suitable compound ratio of thermo-fusible fluoro-resin particles, and other condition parameters, and the resulting composite material is ideal for use as insulating material.

Moreover, the hollow particles comprising thermo-fusible fluoro-resin are soft based on the natural properties of the underlying material and so the composite material is neither hard nor fragile in contrast to a composite material which includes microscopic hollow balls made of glass. Furthermore, the resulting material exhibits an excellent resistance to the effects of heat and/or chemical attack, is impervious and insulating relative to heat transfer, to organic solvents and others in the process of molding the composite material and while in use, and its stable properties are maintained.

It will be understood that each of the elements described above, or two or more together, may also find a useful application in other types of composite materials and methods of composite formation differing from the types described above.

While the invention has been illustrated and described as embodied in the context of a low-permittivity composite material, it is not intended to be limited to the details shown, since various modifications within the respective technical concepts may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A composite material having low permittivity comprising
    hollow bubbles formed of a thermo-fusible fluoro-resin selected from the group consisting of ethylene-tetra-fluoride-propylene-hexafluoride copolymer resin, ethylene-ethylene-tetrafluoride copolymer resin, ethylene-ethylene-chloride-trifluoride copolymer resin, and mixtures thereof; a polymer material surrounding and supporting the thermo-fusible fluoro-resin forming the hollow bubbles.

2. The composite material according to claim 1, wherein the hollow bubbles are substantially separated from neighboring bubbles by the polymer material.

3. The composite material according to claim 1, wherein a first hollow bubble and a second hollow bubble are separated from each other by a layer of the thermo-fusible fluoro-resin of the first bubble, followed by a layer of polymer material, followed by a layer of thermo-fusible fluoro-resin of the second bubble, and where the ratio of the thickness of the polymer layer to the sum of the layers of the thermo-fusible fluoro-resin is on average from about 0.3 to 3.

4. The composite material according to claim 1, wherein the hollow bubbles are defined by a foamed thermo-fusible fluoro-resin subjected to grinding and mixed with the polymer material.

5. The composite material according to claim 4, wherein the hollow bubbles have a diameter which is less than about half of the average grain size of the ground thermo-fusible fluoro-resin.

6. The composite material according to claim 1, wherein the hollow bubbles are defined by a ground thermo-fusible fluoro-resin subjected to foaming and mixed with the polymer material.

7. The composite material according to claim 1, wherein the hollow bubbles are defined by a ground thermo-fusible fluoro-resin incorporated in the polymer material, wherein the hollow bubbles are expanded inside the polymer material based on a foaming agent enclosed inside the fluoro-resin prior to incorporation and foaming.

8. The composite material according to claim 1, wherein the size of the bubbles is from about 0.3 to 0.6 of the average grain size of ground thermo-fusible fluoro-resin.

9. The composite material according to claim 1, wherein the thermo-fusible fluoro-resin is tetrafluoro-ethylene-perfluoro-alkyl-vinyl ether.

10. The composite material according to claim 1, wherein the hollow bubbles are formed by foaming of the thermo-fusible fluoro-resin to a 50 to 90 percent degree.

11. The composite material according to claim 1, wherein the polymer material is ethylene-tetrafluoride resin.

12. The composite material according to claim 1, wherein the composite material has a permittivity of less than 1.8.

13. The composite material according to claim 1, wherein the composite material has a permittivity of less than about 1.4.

* * * * *